United States Patent
Koshy et al.

(10) Patent No.: US 7,593,489 B2
(45) Date of Patent: Sep. 22, 2009

(54) ITERATIVE STBICM MIMO RECEIVER USING GROUP-WISE DEMAPPING

(76) Inventors: John C. Koshy, 6 Minosa Ct., Jackson, NJ (US) 08527; Joseph C. Liberti, 11 Spruce Hollow Dr., Howell, NJ (US) 07731; Timothy R. Hoerning, 825 Filbert St., Roselle Park, NJ (US) 07204

( * ) Notice: Subject to any disclaimer, the term of this patent is extended or adjusted under 35 U.S.C. 154(b) by 306 days.

(21) Appl. No.: 11/374,835

(22) Filed: Mar. 14, 2006

(65) Prior Publication Data
US 2007/0041475 A1      Feb. 22, 2007

Related U.S. Application Data

(60) Provisional application No. 60/661,551, filed on Mar. 14, 2005, provisional application No. 60/716,468, filed on Sep. 13, 2005.

(51) Int. Cl.
H04L 27/06    (2006.01)
H04L 1/02    (2006.01)

(52) U.S. Cl. .................. 375/340; 375/347; 375/267
(58) Field of Classification Search .......... 375/267, 375/340, 347
See application file for complete search history.

(56) References Cited

U.S. PATENT DOCUMENTS
7,095,812 B2 * 8/2006 Chan et al. ............ 375/341
2003/0235149 A1 * 12/2003 Chan et al. ............ 370/206
2006/0253765 A1 * 11/2006 Boer et al. ............. 714/749

OTHER PUBLICATIONS

Pierre-Jean Bouvet, Maryline Hélard, Vincent Le Ni, "Low complexity iterative receiver for linear precoded MIMO systems," ISSSTA2004, Sydney, Australia, Aug. 30-Sep. 2, 2004.*
John C. Koshy et al, A New Low-Complexity Demapper for High-Performance Iterative MIMO: An Information-Theoretic and BER Analyses, Proc. IEEE ICASSP '05, Mar. 2005, vol. 3, pp. 1029-1032.
Stephan Baro et al, Iterative Detection of MIMO Transmission Using a List-Sequential (LISS) Detector, Proc. IEEE Int. Conf. on Commun. ICC03, May 2003, pp. 2653-2657.
Bertrand M. Hochwald et al, "Achieving Near-Capacity on a Multiple-Antenna Channel", *IEEE Trans. Commun.*, vol. 51, No. 3, pp. 389-399.
Patrick Robertson et al, "A Comparison of Optimal and Sub-Optimal MAP Decoding Algorithms Operating in the Log Domain", *Proc. IEEE Int. Conf. Communications*, Jun. 1995, pp. 1009-1013.

* cited by examiner

*Primary Examiner*—David C Payne
*Assistant Examiner*—Nader Bolourchi
(74) *Attorney, Agent, or Firm*—Fitch, Even, Tabin & Flannery

(57) ABSTRACT

A STBICM MIMO receiver includes a plurality of demappers for demapping a plurality of complex symbols transmitted by a STBICM MIMO transmitter. Each demapper is configured to have one or more complex symbols associated therewith and is responsible for demapping its associated complex symbols.

22 Claims, 5 Drawing Sheets

ITERATIVE STBICM MIMO RECEIVER USING GROUP-WISE DEMAPPING

RELATED APPLICATIONS

This application is based on and claims priority to U.S. Provisional Application No. 60/661,551, filed on Mar. 14, 2005, entitled "MULTI-INPUT MULTI-OUTPUT (MIMO) SYSTEM USING ITERATIVE DETECTION WITH SOFT CANCELLATION," by Joseph Liberti, John Koshy, and Timothy Hoerning to which a claim of priority is hereby made and the disclosure of which is incorporated by reference.

This application is also based on and claims priority to U.S. Provisional Application No. 60/716,468, filed on Sep. 13, 2005, entitled "ITERATIVE MULTI-INPUT (MIMO) SYSTEM USING GROUP-WISE DEMAPPER WITH ADJUSTABLE PERFORMANCE AND COMPLEXITY," by John Koshy and Joseph Liberti and to which a claim of priority is hereby made and the disclosure of which is incorporated by reference.

GOVERNMENT LICENSE RIGHTS

This invention was made with Government support under agreement No. DAAD19-01-2-0011 awarded by the U.S. Army Research Laboratory. The Government has certain rights in this invention.

BACKGROUND OF THE INVENTION

1. Field of the Invention

The present invention relates generally to an iterative multi-input multi-output (MIMO) receiver, and more specifically, to a MIMO receiver that uses group-wise demapping.

2. Description of Related Art

For multiple-input multiple-output (MIMO) systems, space-time bit-interleaved coded modulation (STBICM) has been recognized as a way for achieving high-rate wireless communications with near capacity performance. Referring to FIG. 1A there is shown a functional architecture of an STBICM MIMO system 100 of the prior art. The system includes a transmitter 110 that encodes an information/data bit sequence u from a binary source 111 and transmits the bit sequence from a plurality (two or more) of transmit elements $N_t$ over a wireless channel 120 to a receiver 130. Receiver 130 includes a plurality of receive elements $N_r$ (where $N_r$ may or may not equal $N_t$) that receive the transmitted information from transmitter 110. Thereafter, receiver 130 recovers/decodes the bit sequence u and transfers the bit sequence to a binary sink 142.

Referring to FIG. 1B, there is shown a functional architecture of a transmitter 110 of the prior art. Transmitter 110 includes an outer encoder 112, a bit interleaver 114, a demultiplexer 116, and a mapper (inner encoder) 118. In operation, the information bit sequence u having a length L is first forward to outer encoder 112 where the bits are encoded using an error correcting code of rate R to yield a coded bit sequence $c_2$ of length L/R. Encoder 112 may be, for example, a Turbo encoder.

The coded bit sequence $c_2$ is next forwarded to bit interleaver 114, which bit interleaves $c_2$, thereby resulting in an interleaved bit sequence $c_1$. Thereafter, the interleaved coded bit sequence is forwarded to demultiplexer 116, which splits the bit sequence $c_1$ into $N_t$ parallel and independent bit streams $d_1 \ldots d_{N_t}$ for example, each of which is assigned to a unique transmit element from among the $N_t$ transmit elements for transmission. One skilled in the art will recognize that it is not necessary that each bit stream be assigned to a unique transmit element, this simplification being assumed only for ease of description. For example, each transmit element may transmit some linear combination of multiple streams, as is the case when using space-time codes.

Bit streams $d_1 \ldots d_{N_t}$ are next forwarded to mapper 118. For a given channel use, mapper 118 splits each bit stream into a block of M bits, maps each block to a complex symbol, and then simultaneously transmits each symbol over channel 120. More specifically, for each channel use, the bit streams $d_1 \ldots d_{N_t}$ can be denoted as a bit vector $x=[x_1, \ldots, x_{N_t}]^T$ of size $N_t M \times 1$ with $x_i = [x_{i,1}, \ldots x_{i,M}]$ for i=1 to $N_t$. Each block of M bits for each stream is mapped onto a symbol $s_i = \text{map}(x_i)$ for i=1 to $N_t$, where the symbols $s_i$ are chosen from a complex constellation of size $2^M$ and alphabet $A=\{a_1, \ldots, a_{2^M-1}\}$. Thereafter, each transmit element simultaneously transmits a corresponding symbol over channel 120 towards receiver 130. The collection of all $N_t$ simultaneously transmitted symbols can be denoted by the vector $s=[s_1, \ldots, s_{N_t}]^T$.

At receiver 130, each of the $N_r$ receive elements receives the symbol stream radiated by each of the $N_t$ transmit elements. During each channel use, the symbol streams received at the receive elements may be denoted as a signal vector y of size $N_r \times 1$. As is known in the art, channel 120 may be represented as a $N_r \times N_t$ channel matrix H where the $ij^{th}$ element of the matrix represents the channel gain between the $j^{th}$ transmit element and the $i^{th}$ receive element. For ease of description, channel 120 is assumed to be flat (frequency non-selective) with Rician-fading and unity gain for each channel coefficient. Nonetheless, one skilled in the art will recognize that when channel 120 is a frequency selective channel, an effective flat-channel may be realized by incorporating an orthogonal frequency division multiplexing (OFDM) modulator and demodulator into transmitter 110 and receiver 130, respectively. One skilled in the art will also recognize that receiver 130 may use standard channel estimation methods to determine channel matrix H. For ease of description, it is assumed that channel matrix H is perfectly known by receiver 130.

Accordingly, vector y at receiver 130 may be given as $$y = Hs + n \quad (1)$$

where n represents an additive white noise vector whose elements are complex Gaussian with zero-mean and variance $\sigma_n^2 = N_0/2$ per real dimension. The average symbol energy per stream $E\{|s_i|^2\}$ may be denoted by $E_s$. Accordingly, it follows that the average signal-to-noise ratio per receive element is $SNR = N_t E_s/(2\sigma_n^2)$.

Referring now to FIG. 1C, there is shown a functional architecture of a receiver 130 of the prior art. Receiver 130 includes a demapper (inner decoder) 132, an outer soft-input soft-output (SISO) decoder 136, a deinterleaver 134, and an interleaver 138. As illustrated, the demapper 132 and decoder 136 are interconnected in a loop and function in an iterative fashion to reconstruct from signal vector y the information bit sequence u transmitted by transmitter 110. Specifically, during the first pass through receiver 130, demapper 132 takes the observation y and knowledge of the channel H and demaps the $N_t$ received complex symbol streams back to the constituent $N_t M$ coded bits by determining soft information for each of the coded bits. In particular, demapper 132 computes the a posteriori probability (APP) log-likelihood ratio (LLR) values for the coded bits. The collection of these LLR values for the coded bits is represented by $L_{D1}$ in FIG. 1C.

Next, the soft information $L_{D1}$ is forwarded to deinterleaver 134, which deinterleaves the LLR values, thereby resulting in a sequence of LLR values that correspond to the coded bit sequence $c_2$ (here it is assumed that sufficient symbols have been received and demapped to produce a sequence of L/R LLR values). These deinterleaved LLR values become an a priori input $L_{A2}$ to SISO decoder 136.

SISO decoder 136 further refines the LLR values given its knowledge of the temporal coupling of the bits and produces soft information for the information bit sequence u and the coded bit sequence $c_2$ by computing a posteriori information of the information bits (represented as $L'_{D2}$ in FIG. 1C) and the coded bits (represented as $L_{D2}$ in FIG. 1C). As an example, SISO decoder 136 may be implemented using the BCJR or log-MAP algorithm, as described by P. Robertson et al., in "A comparison of optimal and sub-optimal MAP decoding algorithms operating in the log domain," *Proc. Int. Conf. Communications*, June 1995, pp. 1009-1013.

The a posteriori information $L'_{D2}$ from SISO decoder 136 is forwarded to hard decision module 140, which uses the LLR values to determine the information bit sequence u. In turn, the a priori information $L_{A2}$ is subtracted (through module 141) from the a posteriori information $L_{D2}$ to produce new (and hence, extrinsic) information $L_{E2}$. Note that the removal of the a priori part $L_{A2}$ minimizes the correlation from previously computed values.

The extrinsic information $L_{E2}$ is next forwarded to interleaver 138, which interleaves the LLR values, thereby resulting in a sequence of LLR values that correspond to the coded bit sequence $c_1$. These interleaved LLR values become a priori information $L_{A1}$ to demapper 132 (with the demapper operating on $N_tM$ of the LLR values). This cycle of detection, decoding, and feedback constitutes the first iteration through receiver 130. Note that in subsequent iterations, the a priori information $L_{A1}$ is subtracted (through module 142) from the a posteriori information $L_{D1}$ from demapper 132 to produce new/extrinsic information $L_{E2}$, which is subsequently forwarded to deinterleaver 134/SISO decoder 136.

In general, each iteration through receiver 130 improves the reliability of the soft-information produced by demapper 132 and SISO decoder 136. The exchange of soft-information between these modules continues until a desired bit-error-rate (BER) performance is achieved. At this point, a final decision is made by hard decision module 140, which uses the a posteriori information $L'_{D2}$ to determine information bit sequence u, with the module deciding a "1" if the LLR value $L'_{D2} \geq 0$ and a "0" otherwise.

Referring now more specifically to demapper 132, prior systems have implemented this demapper as a joint-stream demapper that computes the LLR values for the $N_tM$ coded bits transmitted in a given channel use over all $N_t$ transmitted symbol streams. Specifically, given the observation y, prior systems have defined the LLR value of $x_{n,m}$, which is the $m^{th}$ (m=1, ... ,M) bit of the $n^{th}$ (n=1, ... ,$N_t$) stream, as $$L(x_{n,m}) = \ln(P(x_{n,m}=+1|y)/P(x_{n,m}=-1|y)) \quad (2)$$

Using standard LLR manipulations and the max-log approximation, these systems have computed the extrinsic LLR value of $x_{n,m}$ as $$L_{E1}(x_{n,m}) \approx \max_{x \in X_{n,m,+1}} \frac{1}{2}\left\{ -\frac{\|y - Hs(x)\|^2}{\sigma_n^2} + x_{[n,m]}^T \cdot L_{A1,[n,m]} \right\} - \max_{x \in X_{n,m,-1}} \frac{1}{2}\left\{ -\frac{\|y - Hs(x)\|^2}{\sigma_n^2} + x_{[n,m]}^T \cdot L_{A1,[n,m]} \right\} \quad (3)$$

where $X_{n,m,b}$ denotes the set of bit vectors x whose $m^{th}$ bit value of the $n^{th}$ stream equals b (i.e., +1 or −1), $x_{[n,m]}$ is the subvector of x omitting the element corresponding to the $m^{th}$ bit of the $n^{th}$ stream, and $L_{A1,[n,m]}$ is a vector containing the a priori information corresponding to the entries in $x_{[n,m]}$. In equation (3), s(x) denotes the mapping from the $N_tM \times 1$ bit vector x to an $N_t \times 1$ symbol vector.

Significantly, as can be seen from equation (3), the per-bit LLR values are computed by considering all possible realizations of the $N_t$ simultaneously transmitted symbols. Consequently, the complexity of the computation is exponential in the product of the number of simultaneously transmitted streams $N_t$ and the bits per symbol M. In other words, for each bit position, the LLR computation requires hypothesizing over $2^{MN_t}$ bit vectors. This exponential complexity makes demapper 132 prohibitive to practical implementation for high spectral efficiency MIMO systems. For example, in a MIMO system transmitting eight parallel symbol streams using a 16-QAM constellation, computation of the per-bit LLR values requires evaluation of $2^{32}$ ($\approx 4 \times 10^9$) possible symbol vectors, which is prohibitive to practical implementation using current silicon technology.

To manage this complexity, others have proposed implementing demapper 132 as an approximate joint-stream demapper using sphere detection (e.g., see Hochwald et al., "Achieving near-capacity on a multiple-element channel," *IEEE Trans. Commun.*, vol. 51, no. 3, pp. 389-399, March 2003). The sphere detector reduces complexity by limiting the hypothesis testing to candidates within a hyper-sphere of a certain radius about the received signal. Specifically, the number of $N_tM \times 1$ bit vectors considered are limited to a specified number of points that are within a certain radius R of the received signal vector y in the maximum-likelihood sense. In other words, only those points that are within the radius R are considered in the evaluation of equation (3). Accordingly, the radius R of the hyper-sphere controls the complexity and performance of the sphere detector.

However, notwithstanding the complexity reduction with respect to the full-search demapper as describe above, the complexity of the sphere detector is still exponential. Further, the complexity of the sphere detector is sensitive to the signal-to-noise ratio and $N_r$, the number of receive elements, when $N_r$ is less than $N_t$, the number of transmitted streams. Specifically, the complexity increases as either of these quantities decreases. The complexity increase is especially significant for regimes where $N_r$ is less than the number of transmitted streams.

To further reduce the complexity of demapper 132 in order to address high-rate near-capacity performing MIMO systems, others have proposed implementing the demapper as a set of $N_t$ single stream demappers, each of which demaps one of the $N_t$ symbol streams. In general, each single stream demapper exploits soft-information to perform cancellation and spatial-filtering to remove from the received signal vector y contributions of all streams other than the stream of interest, and then demaps this stream. As result, the complexity of demapper 132 is polynomial in the number of streams $N_t$.

Notably, from a performance perspective, for a critically loaded MIMO configuration (i.e., the number of transmitted streams equals the number of receive elements) operating in a low-correlation channel, the single stream demappers have been found to be comparable to the joint-stream demappers. However, as the channel becomes more correlated and/or as the number of receive elements used for stream separation becomes less than the number of transmitted streams, performance of the single stream demappers begins to depart from that of the joint-stream demappers. Nonetheless, for high rate systems under these conditions, the joint-stream demappers are not practically feasible, as described above.

SUMMARY OF THE INVENTION

Accordingly, it is desirable to provide an STBICM MIMO receiver that includes a demapper that has performance like that of the joint-stream demappers but has reduced complexity amenable to practical implementation, thereby overcoming the above and other disadvantages of the prior art. According to an embodiment of the invention, an STBICM MIMO receiver includes a demapper interfaced to one or more receive elements, a soft-input-soft output (SISO) decoder interfaced to an output of the demapper, and a soft-symbol mapper that is interfaced to an output of the SISO decoder and to an input of the demapper. The demapper, SISO decoder, and soft-symbol mapper function as an iterative loop receiver that recovers an information bit sequence u that was transmitted by an STBICM MIMO transmitter as a plurality of complex symbols.

Specifically, according to an embodiment of the invention the demapper takes an observation y of complex symbol streams and demaps the complex symbol streams on a group-wise basis back to the coded bits that constitute each stream by determining soft information in the form of LLR values for each of the coded bits. In particular, according to an embodiment of the invention, the demapper includes single stream demappers and/or group stream demappers. Prior to demapping and decoding the observation y, a group construction module assigns each of the symbol streams to a group, with each stream being assigned to only one group. In certain instances, the group construction module may assign a stream to be the only member of a group. According to an embodiment of the invention, the group construction module may assign streams to groups such that the more correlated streams are assigned to the same groups, thereby maximizing performance. For each group having only a single member, the group construction module thereafter assigns each stream to a respective single stream demapper. Similarly, for each group of streams having two or more stream members, the group construction module assigns each group to a respective group stream demapper.

Once the group construction module assigns each stream to a group, for each iteration of the receiver each single stream demapper demaps its associated stream independently of all other streams. Similarly, each group stream demapper jointly demaps its associated streams independently of all other streams not in the group. Specifically, according to an embodiment of the invention, each single stream demapper and each group stream demapper performs the demapping by first taking the observation y and canceling from this signal the contributions of all other interfering streams (i.e., those streams that are not members of the group). To perform this cancellation, the soft-symbol mapper first reconstructs a soft representation of each symbol using soft information from the SISO decoder. At each demapper, the soft symbols corresponding to the interfering streams (i.e., the streams that are not members of the group) are filtered through the interfering streams' channel responses and the resulting interference signal then subtracted from signal y. Accordingly, each demapper obtains a "cleaned" version of the received signal y from the point of view of the streams assigned to that group. In addition to soft cancellation, each single stream demapper may also pass the "cleaned" version of the received signal y through a soft spatial filter to minimize the contributions of any residual interference left over from the canceling process and/or to enhance the desired stream.

Once removing the contributions of the interfering streams from signal y, each single stream demapper uses its variation of the "cleaned" signal to demap its corresponding complex symbol stream by computing soft information in the form of an LLR value for each of the bits constituting that symbol. Similarly, each group stream demapper uses its variation of the "cleaned" signal to jointly demap its corresponding group of complex symbol streams by computing soft information in the form of an LLR value for each of the bits constituting each symbol in that group. According to an embodiment of the invention, each single stream demapper has a per bit complexity that is exponential in the number of bits per symbol and each group stream demapper has a per bit complexity that is exponential in the number of bits per symbol by the number of symbols in the group. Accordingly, the single stream and group stream demappers of the present invention have a reduced complexity as compared to the joint-stream demappers of the prior art that jointly demap over all the symbols. According to another embodiment of the invention, the complexity of each group stream demapper may be further reduced by using a reduced search technique.

Once each single stream and group stream demapper demaps its corresponding set of symbols, the resulting LLR values are combined into a single sequence of LLR values and then deinterleaved, to produce a sequence of LLR values that represent/correspond to the coded bit sequence $c_2$ at the transmitter. These deinterleaved LLR values become a priori input to the SISO decoder.

Given the a priori input, the SISO decoder further refines the LLR values and produces soft information for the information bit sequence u and the coded bit sequence $c_2$ by computing a posteriori information of the information bit sequence and the coded bit sequence. The a posteriori information of the information bit sequence u is forwarded to a hard decision module, which eventually uses the LLR values to determine the information bit sequence u. In turn, the a posteriori information of the coded bit sequence, and also an extrinsic form of this information, are each interleaved and then demultiplexed into streams of LLR values constituting each of the symbol streams. The extrinsic LLR values are fed back to the demapper as a priori information for use by the single stream and group stream demappers in subsequent iterations of demapping the symbol streams. The a posteriori LLR values in turn are forwarded to the soft symbol mapper, which uses the LLR values to reconstruct a soft symbol corresponding to each of the received symbol streams. Thereafter, the soft symbol mapper forwards the reconstructed soft symbols to the appropriate single stream demappers and group stream demappers, each of which uses the soft symbols to cancel from the received signal y the contributions of interfering streams as described above. Accordingly, the iterative detection process thereafter repeats.

Advantageously, the present invention allows streams to be assigned to groups and demapped on a group-wise basis, thereby obtaining a balance between the processing power of the receiver and a desired receiver performance. Specifically, the performance of the demapper of the present invention generally improves as more streams are added to the same group such that the streams are jointly detected (i.e., the performance of the demapper generally improves as the demapper converges to one group stream demapper). However, increasing the size of any group also increases the complexity of the overall demapper. According to an embodiment of the invention, by adjusting the number of groups (i.e., the number of single stream and group stream demappers) and the size of each group, the complexity of the overall demapper may be adjusted to correspond to the processing power of the receiver to obtain a maximum possible performance for a given receiver complexity. In other words, the present invention is able to deliver a receiver performance that takes full advantage of the receiver processing power.

Other features and advantages of the present invention will become apparent from the following description of the invention, which refers to the accompanying drawings.

DETAILED DESCRIPTION OF THE PREFERRED EMBODIMENTS

Figure 1A:
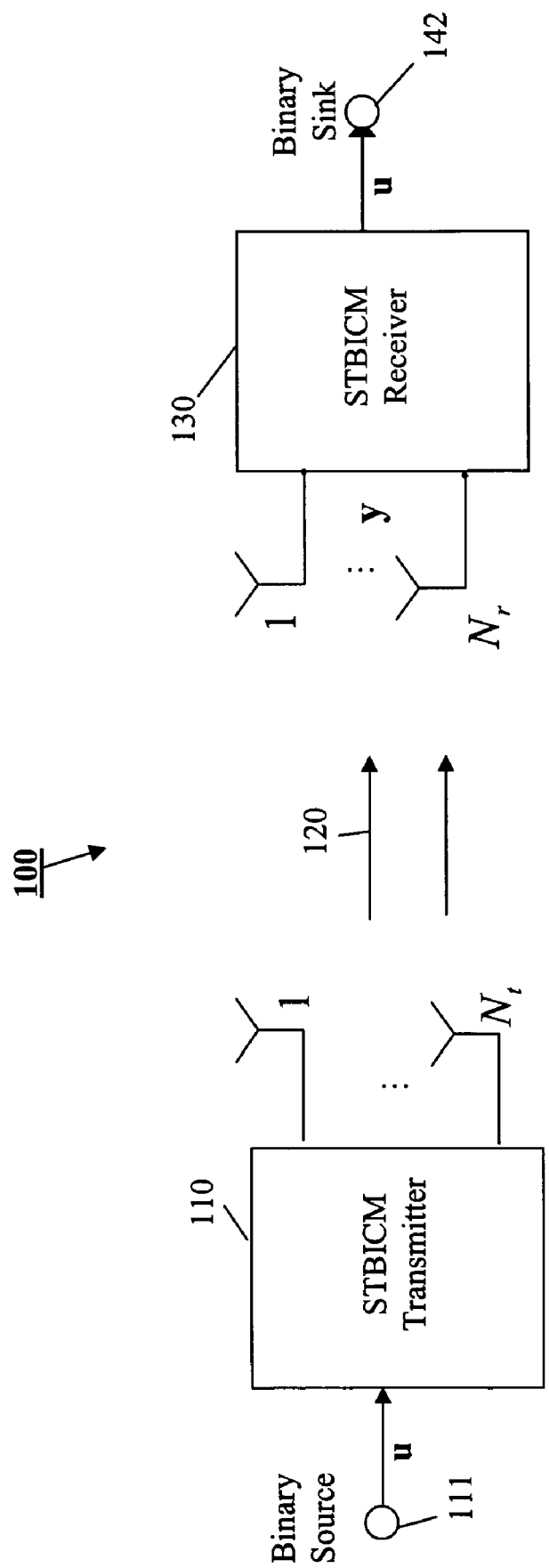
FIG. 1A shows a functional architecture of an STBICM MIMO system of the prior art.
Figure 1B:
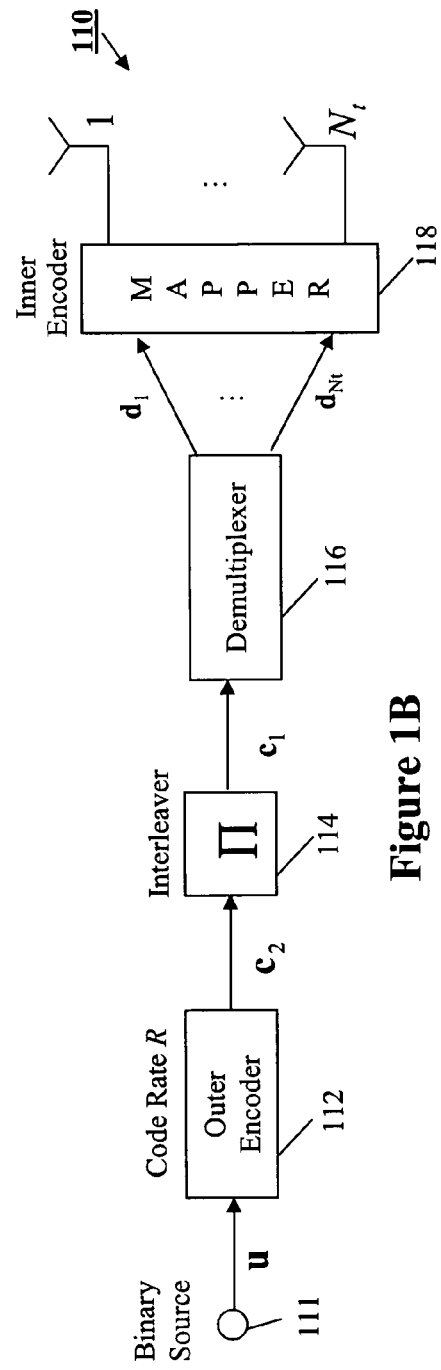
FIG. 1B shows a functional architecture of an STBICM MIMO transmitter of the prior art.
Figure 1C:
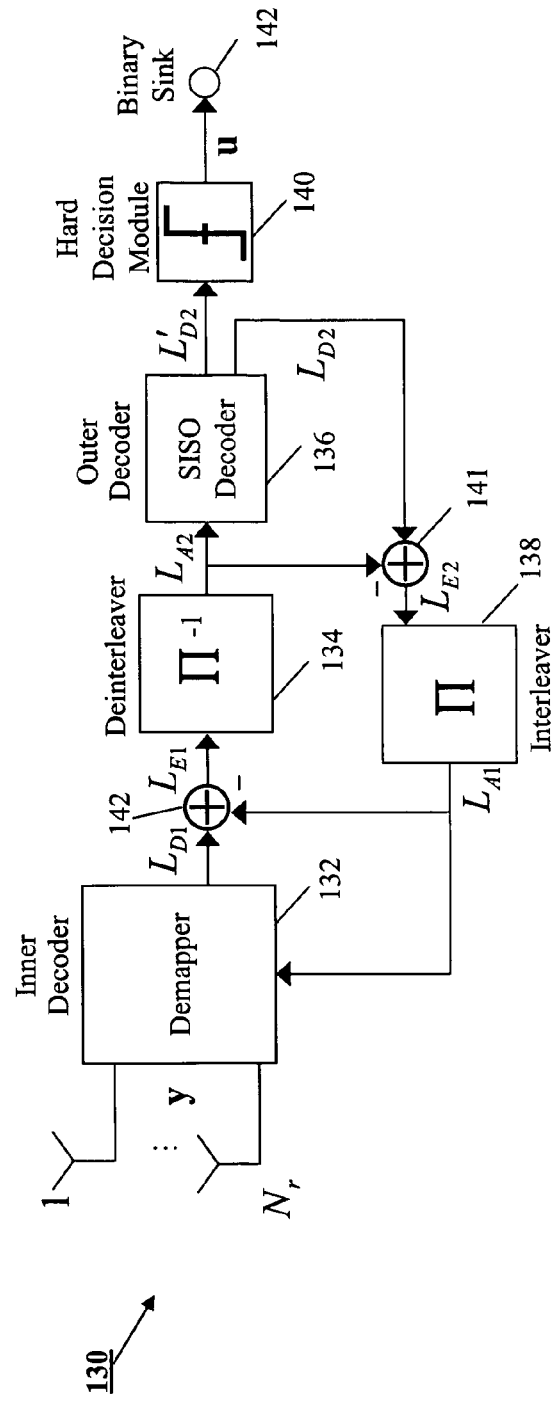
FIG. 1C shows a functional architecture of an STBICM MIMO receiver of the prior art.
Figure 2:
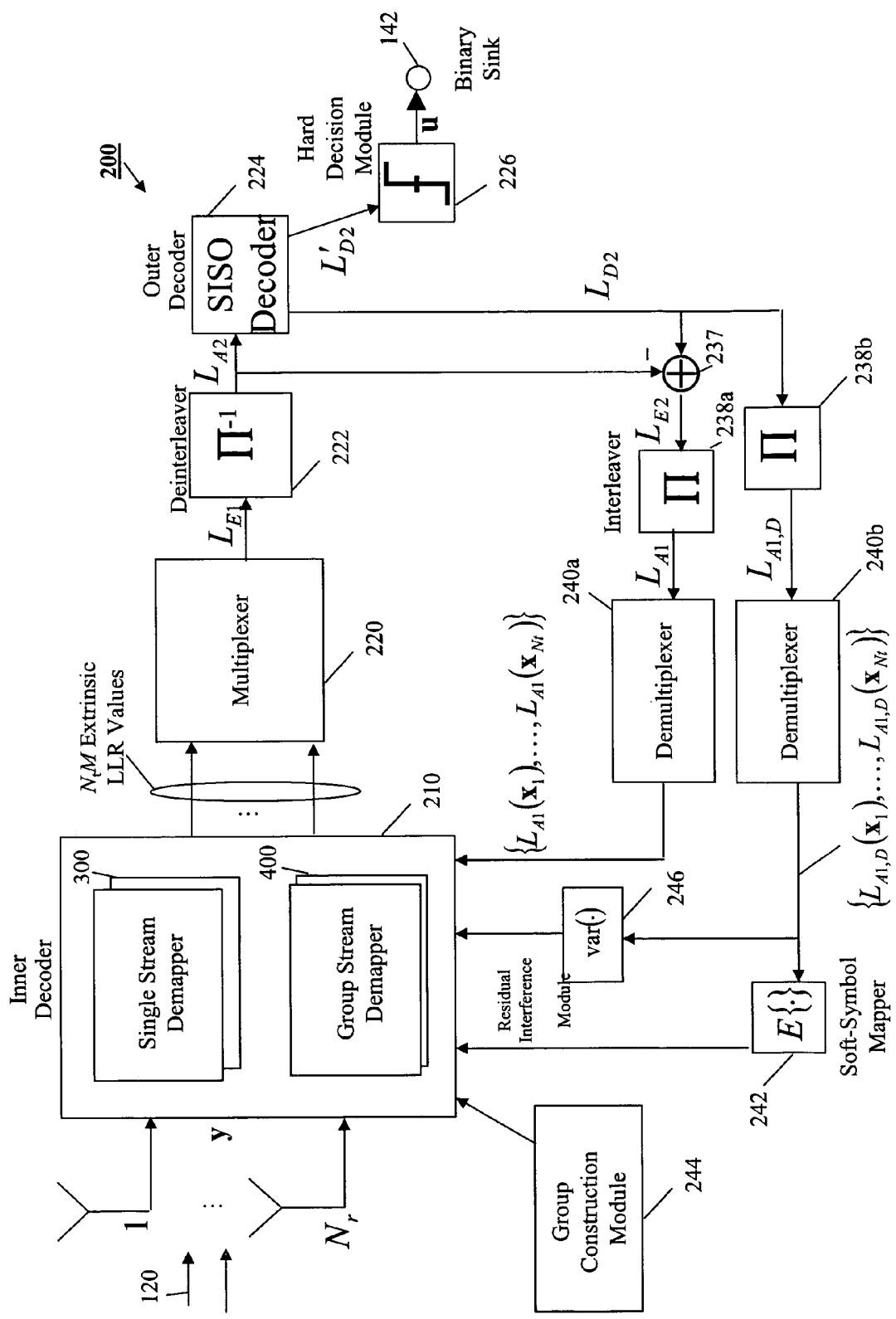
FIG. 2 shows a functional architecture of an STBICM MIMO receiver according to an embodiment of the invention, the receiver including one or more group stream demappers and/or one or more single stream demappers.

Referring to FIG. 2, there is illustrated a functional architecture of a receiver 200 according to an embodiment of the invention. Receiver 200 is STBICM MIMO receiver with $N_r$ receive elements ($N_r \geq 1$) and uses iterative detection to recover an information bit sequence u transmitted over a wireless channel 120 by an STBICM transmitter, such as transmitter 110, having $N_t$ transmit elements. The number of receive elements $N_r$ may or may not equal the number transmit elements $N_t$. For ease of description, the invention will be described under the assumption that during each channel use, there are $N_s = N_t$ transmitted symbol streams where each stream is transmitted by a unique transmit element $N_t$. Accordingly, the following discussion and disclosed equations are based on this assumption. Nonetheless, one skilled in the art will recognize that the invention is not limited to this simplification.

For example, each transmit element may transmit some linear combination of multiple streams, as is the case when using space-time codes. Consider a space-time code matrix $\Phi$ of dimension $N_t \times l$, where l represents the time dimension of the code. After mapping the coded interleaved bits $c_1$ into complex symbols chosen from a particular constellation, the symbols are gathered in blocks of length l and may be denoted as a symbol vector s of dimension $l \times 1$. s is then mapped through the space-time code $\Phi$ to yield a new transmit vector $\Phi$s of dimension $N_t \times 1$. Each element of $\Phi$s, which contains some combination of the l symbols, is now transmitted via a unique antenna. This is different from the above assumption where each symbol is sent via a unique antenna as implied in equation (1). Accordingly, to apply the equations as disclosed herein to a space-time code system, the channel matrix H should be replaced by $H_{eq} = H\Phi$ and the demapping of the symbols should be done over l as opposed to $N_t$ symbols.

Referring again to receiver 200 and making the assumption that each stream is transmitted by a unique transmit element $N_t$ as described above, during each channel use each of the $N_r$ receive elements of receiver 200 receives the symbol stream radiated by each of the $N_t$ transmit elements. The symbol streams received by the receive elements may be denoted as the signal vector y. Channel 120 may be represented as a $N_r \times N_t$ channel matrix H. For ease of description, channel 120 is assumed to be flat with Rician-fading and unity gain for each channel coefficient. Nonetheless, one skilled in the art will recognize that for a frequency selective channel, receiver 200 may include an OFDM demodulator (and similarly, the corresponding transmitter may include an OFDM modulator) to realize an effective flat-channel. Receiver 200 may use standard channel estimation methods as is known in the art to determine channel matrix H. For ease of description, it is assumed that receiver 200 perfectly knows channel matrix H.

As further illustrated in FIG. 2, receiver 200 includes a demapper (inner decoder) 210 interfaced to the $N_r$ receive elements and an outer soft-input-soft output (SISO) decoder 224 that receives soft information produced by demapper 210 through multiplexer 220 and deinterleaver 222. As indicated, receiver 200 is an iterative receiver such that soft information produced by SISO decoder 224 is fed back to demapper 210 through a combination of interleavers 238a/238b, multiplexers 240a/240b, and soft-symbol mapper 242. Demapper 210 and SISO decoder 224 exchange soft information through this iterative loop with each iteration improving the soft information until a desired BER performance is achieved. At this point, hard decision module 226 uses the soft information to determine information bit sequence u.

The functional architecture of receiver 200 may be implemented in software and/or firmware across one or more microprocessors. One skilled in the art will also recognize that each functional component of receiver 200 may be implemented as a single process or as multiple processes that execute across one or more microprocessors.

Referring now more specifically to the operation of receiver 200, according to an embodiment of the invention demapper 210 first takes the observation y and knowledge of channel matrix H and demaps the $N_t$ received complex symbol streams back to the constituent $N_t M$ coded bits by determining soft information for each of the coded bits. In particular, demapper 210 computes LLR values for each of the $N_t M$ coded bits. Significantly, however, according to an embodiment of the invention demapper 210 performs this demapping of the symbol streams on a group-wise basis.

Specifically, as shown in FIG. 2, receiver 200 further includes a group construction module 244 that is associated with demapper 210. According to an embodiment of the invention, group construction module 244 assigns each of the $N_t$ streams to a group, with each stream being assigned to only one group. In certain instances, group construction module 244 may assign a stream to be the only member of a group. As an example, group construction module 244 may assign streams that exhibit a high degree of correlation to the same group. As further shown in FIG. 2, demapper 210 includes one or more single stream demappers 300 and one or more group stream demappers 400. For each group having only a single member, group construction module 244 assigns each stream to a respective single stream demapper 300. Similarly, for each group of streams having two or more stream members, group construction module 244 assigns each group to a respective group stream demapper 400.

In general, for any given instance of receiver 200, group construction module 244 may assign the same number of streams to each multi-stream group or may assign a different number of streams to each multi-stream group (assuming there is more than one multi-stream group). In addition, for any given instance of receiver 200, group construction module 244 may only form multi-stream groups, may only form single stream groups, or may form a combination of both multi-stream groups and single stream groups. At the extremes, group construction module 244 may only form one group having all $N_t$ streams as it members, or may form $N_t$ single stream groups. Accordingly, for any given instance of receiver 200, the number of single stream demappers 300 and group stream demappers 400 may be flexibly configured. Significantly, according to an embodiment of the invention, group construction module 244 may configure the number and size of each group such that the resulting complexity of demapper 210 (i.e., the number and member size of each demapper 300/400) is matched to the processing power of the receiver to deliver the maximum possible performance for the specified receiver complexity.

Assuming group construction module 244 has configured demapper 210 and assigned each stream to a group, for each iteration (other than the first iteration, which is discussed below) each single stream demapper 300 and each group stream demapper 400 demaps its associated streams individually and independently of the other demappers. Accordingly, each single stream demapper 300 demaps its associated stream alone and independently of all other streams. Similarly, each group stream demapper 400 jointly demaps its associated streams independently of all other streams not in the group.

Specifically, according to an embodiment of the invention, each single stream demapper 300 and each group stream demapper 400 performs the demapping by first taking the observation y and removing/canceling from this signal vector the contributions of all other interfering streams (i.e., those streams that are not members of the group). The demappers perform this canceling operation through a process of soft-cancellation. To perform this soft-cancellation, soft-symbol mapper 242 first reconstructs a soft representation of each symbol using soft information from SISO decoder 224. The resulting soft symbols are then forwarded to demapper 210 and directed to each single stream demapper and each group stream demapper as needed. At each demapper, the soft symbols corresponding to the interfering streams (i.e., the streams that are not members of the group) are filtered through the interfering streams' channel responses and the resulting interference signal then subtracted from signal vector y. Accordingly, each demapper obtains a "cleaned" version (i.e., interference-excised version) of the received signal y from the point of view of the streams assigned to that group. Note that with respect to the term "cleaned", all interference may not be removed from signal vector y. Specifically, the extent to which the interference is removed from signal vector y depends on how reliably the interfering symbols are reconstructed. The more accurate the reconstruction, the better the cancellation. Conversely, the less accurate the reconstruction, the more the residual interference.

In addition to soft-cancellation, each single stream demapper 300 may also pass the "cleaned" version of the received signal vector y through a spatial filter to minimize the contributions of any residual interference left over from the canceling process and/or to enhance the desired stream. In general, because receiver 200 is an iterative filter, the quality of the cancellation at each demapper improves with each iteration.

Once removing the contributions of the interfering streams from signal vector y, each single stream demapper uses its variation of the "cleaned" version of the signal vector to demap its corresponding complex symbol stream back to the M coded bits constituting that stream. Similarly, each group stream demapper uses its variation of the "cleaned" version of signal vector y to demap its corresponding group of received complex symbol streams back to the M coded bits constituting each stream in that group. According to an embodiment of the invention, each single stream demapper and each group stream demapper performs this demapping by computing soft information in the form of an extrinsic LLR value for each of the M bits constituting the corresponding demapped symbol streams. Accordingly, each single stream demapper 300 produces a sequence of M extrinsic LLR values for the corresponding demapped stream. Similarly, each group stream demapper 400 produces a sequence of M extrinsic LLR values for each of the demapped symbol streams in that group. Accordingly, demapper 210 generates a plurality of individual sequences of LLR values from the different single stream and group stream demappers, with the total number of LLR values being $N_t M$.

Continuing with the operation of receiver 200, the individual sequences of extrinsic LLR values produced by demapper 210 for the various streams are next forwarded to multiplexer 220, which multiplexes the LLR values back into a single interleaved sequence of LLR values, denoted as $L_{E1}$ in FIG. 2. This single sequence of LLR values is then forwarded to deinterleaver 222, which deinterleaves the LLR values to produce a sequence of LLR values that represent/correspond to the coded bit sequence $c_2$ at the transmitter. Note that here, it is assumed that sufficient symbols have been received and demapped such that deinterleaver 222 produces a sequence of L/R LLR values constituting coded bit sequence $c_2$. These deinterleaved LLR values become a priori input $L_{A2}$ to SISO decoder 224.

Given the a priori input $L_{A2}$, SISO decoder 224 further refines the LLR values given its knowledge of the temporal coupling of the bits and produces soft information for the information bit sequence u and the coded bit sequence $c_2$ by computing a posteriori information of the information bit sequence (represented as $L'_{D2}$ in FIG. 2) and the coded bit sequence (represented as $L_{D2}$ in FIG. 2). As an example, SISO decoder 226 may be a Turbo decoder (corresponding to outer encoder 112) and may be implemented using the BCJR or log-MAP algorithm, as described by P. Robertson et al., in "A comparison of optimal and sub-optimal MAP decoding algorithms operating in the log domain," *Proc. Int. Conf. Communications*, June 1995, pp. 1009-1013, which document is hereby incorporated by reference as if fully set forth in its entirety herein. Nonetheless, one skilled in the art will recognize that SISO decoder 224 may be implemented in other fashions without deviating from the present invention.

The a posteriori information $L'_{D2}$ is forwarded to hard decision module 226, which uses the LLR values to determine information bit sequence u. In turn, the a posteriori information of the coded bit sequence is fed back to demapper 210 as both the total information (i.e., $L_{D2}$) and as extrinsic information $L_{E2}$, which is obtained by subtracting (through module 237) the a priori information $L_{A2}$ from the a posteriori information $L_{D2}$. Removal of the a priori part $L_{A2}$ minimizes the correlation from previously computed values.

The extrinsic information $L_{E2}$ is forwarded to interleaver 238a, which interleaves the LLR values to become a priori information $L_{A1}$ to demapper 210. In particular, the a priori information $L_{A1}$ is forwarded to demultiplexer 240a, which demultiplexes the LLR values into $N_t$ streams of M LLR values constituting each of the $N_t$ symbol streams. These $N_t$ streams of LLR values are denoted as $\{L_{A1}(x_1), \ldots, L_{A1}(x_{N_t})\}$ in FIG. 2 and are forwarded to the appropriate single stream demappers 300 and group stream demappers 400 of demapper 210 to be used in the subsequent demapping of the symbol streams.

Similarly, the total information $L_{D2}$ is forwarded to interleaver 238b, which interleaves the LLR values to become the total a priori information $L_{A1,D}$ to both demapper 210 and soft-symbol mapper 242. In particular, the total a priori information $L_{A1,D}$ is forwarded to demultiplexer 240b, which demultiplexes the LLR values into $N_t$ streams of M LLR values constituting each of the $N_t$ symbol streams. These $N_t$ streams of LLR values are denoted as $\{L_{A1,D}(x_1), \ldots, L_{A1,D}(x_{Nt})\}$ in FIG. 2 and are forwarded to demapper 210 through residual interference module 246 (which is further described below) to be used in the subsequent demapping of the symbol streams. In addition, the streams of LLR values $\{L_{A1,D}(x_1), \ldots, L_{A1,D}(x_{Nt})\}$ are also forwarded to soft-symbol mapper 242.

Continuing with soft-symbol mapper 242, this module receives the streams of LLR values from demultiplexer 240b and reconstructs a soft symbol corresponding to each of the received symbol streams. As shown in FIG. 2, the soft symbols are preferably reconstructed from the LLR values $\{L_{A1,D}(x_1), \ldots, L_{A1,D}(x_{Nt})\}$, which are derived from the total a posteriori information from decoder 224, as compared to the LLR values $\{L_{A1}(x_1), \ldots, L_{A1}(x_{Nt})\}$, which are derived from the extrinsic information. This configuration is preferable in that the LLR values $\{L_{A1,D}(x_1), \ldots, L_{A1,D}(x_{Nt})\}$ contain more information about the actual transmitted symbols and hence, result in a more accurate reconstruction of the soft symbols and the residual interferences derived there-from. As described above, the reconstructed symbols produced by soft-symbol mapper 242 are forwarded to the appropriate single stream demappers 300 and group stream demappers 400 of demapper 210, each of which use the soft symbols to cancel from the received signal vector y the contributions of the interfering streams. Accordingly, the iterative detection process thereafter repeats as described above.

Overall, the exchange of soft information between demapper 210, SISO decoder 224, and soft-symbol mapper 242 continues until a desired bit-error-rate (BER) performance is achieved. At this point, a final decision is made by hard decision module 226, which uses the a posteriori information $L'_{D2}$ from SISO decoder 224 to determine information bit sequence u, with the module deciding a "1" if the LLR value $L'_{D2} \geq 0$ and a "0" otherwise.

As described above, it was assumed that the iterative detection process was on a second or subsequent pass through the detection loop. As is now more readily apparent, during the initial pass/iteration through demapper 210, there is no soft information from SISO decoder 224 available to soft-symbol mapper 242 for the reconstruction of soft symbols. As such, during this initial pass, it is not possible for the single stream and group stream demappers of demapper 210 to reconstruct the contributions of non-member interfering streams and to perform soft cancellation. As such, according to an embodiment of the invention, for the initial pass through demapper 210, each symbol stream is assigned to a single stream demapper 300 and only single stream demapping is performed. Note that each single stream demapper 300 only uses spatial filtering to minimize the contributions of the interfering streams given that soft cancellation cannot be performed. Thereafter, during the second and subsequent iterations through demapper 210, soft information from SISO decoder 224 is available for soft symbol reconstruction and soft cancellation can thereby be performed. Accordingly, after the first pass through demapper 210, group construction module 244 initializes demapper 210 and a combination of group and/or single stream demapping is performed as described above.

Reference will now be made in greater detail to soft-symbol mapper 242, single stream demapper 300, group stream demapper 400, and group construction module 244. Beginning with soft-symbol mapper 242, as indicated above, this module uses soft information from SISO decoder 224 to reconstruct a soft symbol for each of the $N_t$ symbol streams. As indicated, each symbol is reconstructed from the a priori feedback $\{L_{A1,D}(x_1), \ldots, L_{A1,D}(x_{Nt})\}$ derived from the total a posteriori information from decoder 224, as compared to the a priori feedback derived from the extrinsic information.

According to an embodiment of the invention, each soft symbol may be computed as an expected value with the $n^{th}$ symbol computed as $$\bar{s}_n = \sum_{i=1}^{2^M} a_i P(s_n = a_i) \quad (4)$$

$$= \sum_{i=1}^{2^M} a_i \prod_{m=1}^{M} P(x_{n,m} = b_{i,m})$$

where $b_{i,m}$ is the value of the $m^{th}$ bit of symbol $a_i$ of alphabet $A = \{a_1, \ldots, a_{2^{M-1}}\}$. The second equation in (4) follows from the assumption that bits within a symbol are independent due to interleaving. The bit probabilities $P(x_{n,m} = b_{i,m})$, by definition of the LLR, may be expressed as $$P(x_{n,m} = b_{i,m}) = \frac{1}{1 + e^{-b_{i,m} L_{A1,D}(x_{n,m})}} \quad (5)$$

where $L_{A1,D}(x_{n,m})$ is the LLR value corresponding to the $m^{th}$ bit of the $n^{th}$ stream. As indicated, the soft symbols computed by soft symbol mapper 242 are forwarded to demapper 210 and to the appropriate single stream and group stream demappers as needed for soft cancellation.

Figure 3:
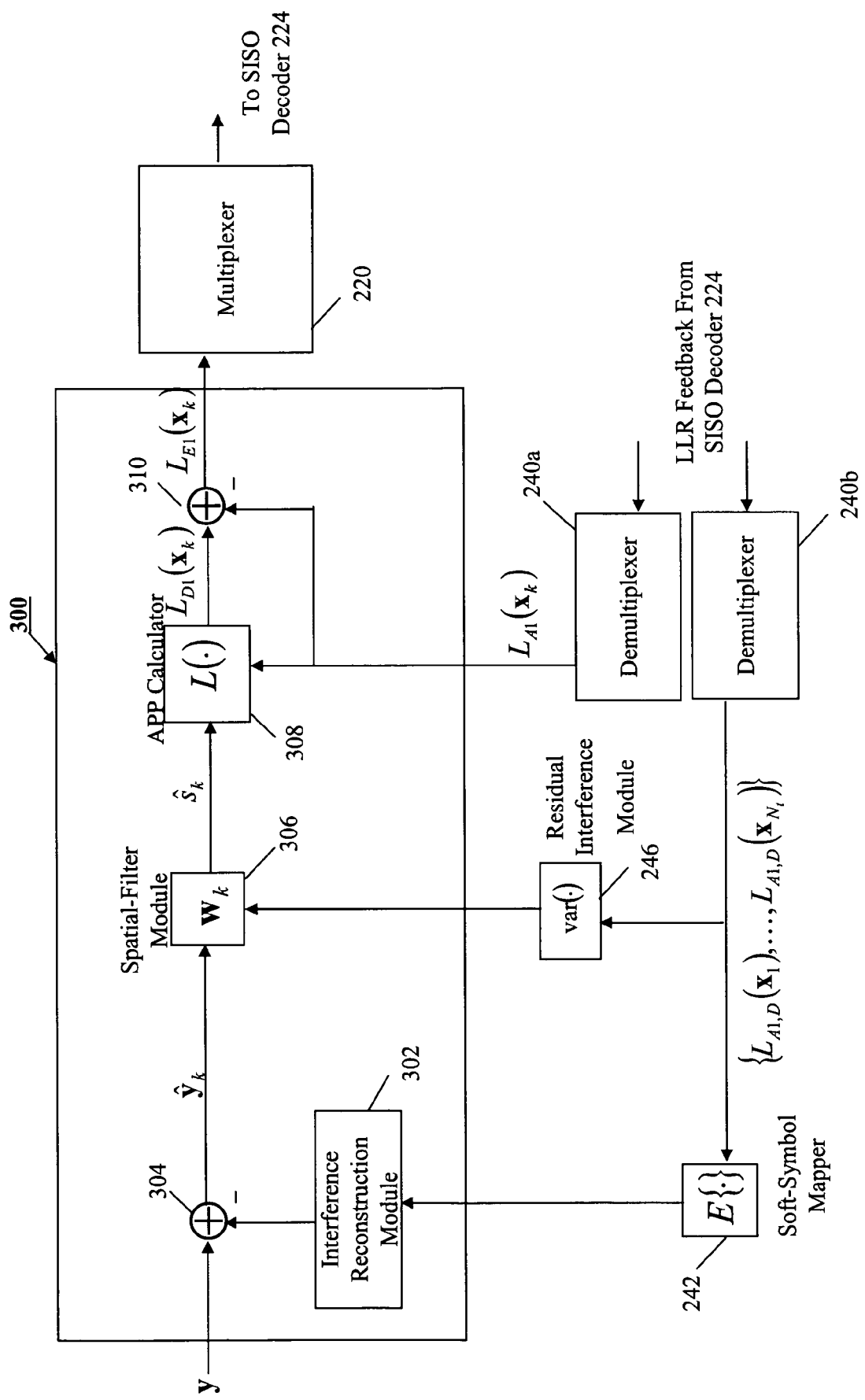
FIG. 3 shows a functional architecture of a single stream demapper according to an embodiment of the invention.

Referring now to FIG. 3, there is a shown a functional architecture of one instance of a single stream demapper 300 according to an embodiment of the invention. For ease of description, it is assumed that the demapper of FIG. 3 demaps a $k^{th}$ stream of interest. Each instance of a single stream demapper within demapper 210 may resemble the functional architecture as shown in FIG. 3.

As shown, single stream demapper 300 includes an interference reconstruction module 302, an interference canceller 304, a spatial filter module 306, and an APP (i.e., soft information) calculator 308. As indicated above, according to an embodiment of the invention each single stream demapper 300 uses a combination of soft cancellation to remove the contributions (i.e., interference) of all interfering streams from received signal vector y and then uses soft spatial filtering on the resulting signal to minimize the contributions of any residual interference left over from the canceling process and/or to also enhance the desired stream. As a result, the $k^{th}$ received stream is isolated and enhanced, depending on how much interference is cancelled. Thereafter, the single stream demapper uses the isolated and enhanced $k^{th}$ received stream and demaps this stream to the M coded bits that constitute the stream by computing soft information for each bit. Interference reconstruction module 302 and interference canceller 304 perform the soft cancellation, spatial filter module 306 performs the soft spatial filtering, and APP calculator 308 performs the demapping.

Beginning with interference reconstruction module 302, this modules receives from soft symbol mapper 242 each of the reconstructed symbols other than the $k^{th}$ symbol and filters these symbols through their channel responses to yield their effective contributions to the received signal vector y. Thereafter, interference canceller 304 removes these contributions of the interfering streams (which may also be referred to as multiple access interference (MAI)) from the received signal vector y. The combined operation may be expressed as $$\hat{y}_k = y - \underbrace{H_{\bar{k}}\bar{s}_{\bar{k}}}_{MAI} \quad (6)$$

where $H_{\bar{k}}$ is the collection of the channel responses for the interfering streams, $\bar{s}_{\bar{k}}$ is the corresponding collection of the expected symbol values of the interfering streams, and $\hat{y}_k$ is the "cleaned" signal vector having the contributions of the interfering streams removed. Again, note that with respect to the term "cleaned", $\hat{y}_k$ may have some residual interference depending on the reliability of the reconstructed soft symbols. The more reliable the soft symbols, the better the fidelity of the reconstruction of the interfering symbols, which leads to better cancellation of the interference. Conversely, using imperfect reconstruction leaves behind residual interference.

Note that as described above, during the initial pass through demapper 210 all streams are assigned to a respective single stream demapper 300 and there is no soft cancellation. The lack of soft cancellation is now more readily apparent from equation (6), where it can be seen that the second term is effectively zero given that soft symbol mapper 242 does not provide reconstructed symbols. Accordingly, during the initial pass through demapper 210, the full load of interference suppression is effectively transferred to spatial filter module 306.

Turning now to spatial filter module 306, this module computes for the desired $k^{th}$ stream a spatial filter $w_k$ that is designed to enhance the desired $k^{th}$ stream through diversity gain and to also minimize the contributions from any residual interference from the interfering streams. Accordingly, once computing the spatial filter $w_k$, spatial filter module 306 thereafter filters the "cleaned" signal vector $\hat{y}_k$ through the filter to yield a scalar symbol estimate $\hat{s}_k$ of the symbol transmitted in the desired $k^{th}$ stream.

According to an embodiment of the invention, spatial filter module 306 may compute the spatial-filter $w_k$ as an MMSE (minimized mean squared error) filter. By definition, the MMSE filter $w_k$ minimizes the mean squared error between the MMSE estimate $w_k^H \hat{y}_k$ and the desired symbol $s_k$. In other words, $w_k$ minimizes the cost function $$J(w) = <|w^H \hat{y}_k - s_k|^2> \quad (7)$$

From standard adaptive filter analysis $w_k$ may be determined by setting the gradient of $J(w)$ to zero and thereby may be given as $$w_k = E\{\hat{y}_k \hat{y}_k^H\}^{-1} E\{\hat{y}_k s_k^*\} \quad (8)$$

Expanding equation (6), $\hat{y}_k$ may be re-written as $$\hat{y}_k = \underbrace{h_k s_k}_{desired\ stream} + \underbrace{H_{\bar{k}} s_{\bar{k}}}_{MAI} - \underbrace{H_{\bar{k}} \bar{s}_{\bar{k}}}_{reconstructed\ MAI} + n \quad (9)$$

$$= h_k s_k + \underbrace{H_{\bar{k}}(s_{\bar{k}} - \bar{s}_{\bar{k}})}_{residual\ MAI} + n$$

Using the form of $\hat{y}_k$ as given in equation (9) and assuming independence of all symbols, $E\{\hat{y}_k \hat{y}_k^H\}$ follows as $$E\{\hat{y}_k \hat{y}_k^H\} = h_k h_k^H E\{|s_k|^2\} + H_{\bar{k}} \Phi_{\bar{k}} H_{\bar{k}}^H + 2\sigma_n^2 I_{N_r} \quad (10)$$

where $\Phi_{\bar{k}} = diag(var(s_1) \ldots var(s_{k-1})\ var(s_{k+1}) \ldots var(s_{N_t}))$, or in other words, is a diagonal matrix containing the variances of the interfering symbols. Similarly, using the form of $\hat{y}_k$ as given in equation (9), $E\{\hat{y}_k s_k^*\}$ may be given as $$E\{\hat{y}_k s_k^*\} = h_k E\{|s_k|^2\} \quad (11)$$

Substituting equations (10) and (11) into equation (8), the MMSE filter $w_k$ may be given as $$w_k = (h_k h_k^H E\{|s_k|^2\} + H_{\bar{k}} \Phi_{\bar{k}} H_{\bar{k}}^H + 2\sigma_n^2 I_{N_r})^{-1} \times h_k E\{|s_k|^2\} \quad (12)$$

In equation (12), the second moments $E\{|s_n|^2\}$ of the symbols $s_n$ may be computed as $$E\{|s_n|^2\} = \sum_{i=1}^{2^M} |a_i|^2 P(s_n = a_i) \quad (13)$$

$$= \sum_{i=1}^{2^M} |a_i|^2 \prod_{m=1}^{M} P(x_{n,m} = b_{i,m})$$

where $P(x_{n,m} = b_{i,m})$ is given as in equation (5). The variances of the symbols $s_n$ may be computed as $$var(s_n) = E\{|s_n|^2\} - E\{s_n\} E\{s_n\}^* \quad (14)$$

where the second moment of the symbols $s_n$ is given as in equation (13) and the first moment $E\{s_n\}$ of the symbols $s_n$ is calculated as shown in equations (4) and (5).

Accordingly, on each iteration of receiver 200, spatial filter module 306 may compute a spatial filter $w_k$ for the desired $k^{th}$ stream as given in equation (12) and thereafter filter the "cleaned" signal vector $\hat{y}_k$ through the filter to obtain a scalar estimate $\hat{s}_k$ of the symbol transmitted in the $k^{th}$ stream. The filtering operation may be expressed as $\hat{s}_k = w_k^H \hat{y}_k$.

As shown in equation (12), the spatial filter $w_k$ is based on soft information from SISO decoder 234 and as such, is recomputed/updated on each iteration of receiver 200. As shown in FIGS. 2 and 3, receiver 200 includes a residual interference module 246. This module is responsible for computing the second moments and variances of each of the symbols as shown in equations (13) and (14) and providing this information as needed to spatial filter 306 of each instance of the single stream demapper 300 so as to recompute/update the spatial filter $w_k$.

According to another embodiment of the invention, spatial-filter $w_k$ may be a signal-to-interference-plus-noise ratio (SINR)-maximizing spatial filter, as described by Koshy, et al., in "A New Low-Complexity Demapper for High-Performance Iterative MIMO: Information-Theoretic and BER Analyses," *Proc. IEEE ICASSP'05*, March 2005, vol. 3, pp. 1029-1032, which document is hereby incorporated by reference as if fully set forth in its entirety herein. A SINR-maximizing spatial filter is essentially a matched filter that maximizes the ratio of the average power of the desired stream to that of the sum of the average powers of the interference from other streams and noise. One skilled in the art will recognize that spatial-filter $w_k$ may be designed in other ways without deviating from the present invention.

Turning now to APP calculator 308, this module takes the filtered symbol estimate $\hat{s}_k$ from spatial filter module 306 and produces soft information of the symbol's M constituent bits and thereafter forwards the soft information to multiplexer 220, thereby completing the demapping of the symbol. According to an embodiment of the invention, APP calculator 308 produces the soft information by computing a posteriori LLR values for the bits. Specifically, given the observation $\hat{s}_k$, the a posteriori LLR value for the $m^{th}$ bit of the $k^{th}$ stream may be defined as $$L_{D1}(x_{k,m}) = \ln \frac{P(x_{k,m} = +1 \mid \hat{s}_k)}{P(x_{k,m} = -1 \mid \hat{s}_k)} \quad (15)$$

Applying Bayes' rule and removing the a priori part $L_{A1}$ $(x_{k,m}) = \ln(P(x_{k,m}=+1)/P(x_{k,m}=-1))$ from $L_{D1}(x_{k,m})$, the extrinsic LLR may be expressed as $$L_{E1}(x_{k,m}) = \ln \frac{\sum_{X_{k,m}(+1)} p(\hat{s}_k \mid x) P(x \mid x_{k,m})}{\sum_{X_{k,m}(-1)} p(\hat{s}_k \mid x) P(x \mid x_{k,m})} \quad (16)$$

where $X_{k,m}(b)$ is the set of all possible bit vectors x corresponding to the $k^{th}$ stream whose $m^{th}$ bit takes the value b (i.e., +1 or −1).

Note that the output of APP calculator 308 is a sequence of a posteriori LLR values for the M bits constituting the $k^{th}$ stream, each LLR value being given as equation (15). This sequence of a posteriori LLR values is denoted as $L_{D1}(x_k)$ in FIG. 3. Thereafter, $L_{D1}(x_k)$ is forwarded through module 310, where a priori information for each of the M bits, as obtained from demultiplexer 240a/SISO decoder 224 and denoted as $L_{A1}(x_k)$ in FIG. 3, is subtracted from the a posteriori LLR values to obtain a sequence of extrinsic LLR values for the M bits. Each extrinsic LLR value is given as equation (16) and the sequence of extrinsic values is denoted as $L_{E1}(x_k)$ in FIG. 3. Note that during the initial pass through demapper 210 where each symbol stream is demapper as single stream as described above, the a priori information $L_{A1}(x_k)$ from demultiplexer 240a/SISO decoder 224 is not available and as such, the a posteriori LLR values $L_{D1}(x_k)$ are initially forwarded to multiplexer 220. Thereafter, for each instance of single stream demapper 300, the extrinsic LLR values $L_{E1}(x_k)$ are forwarded to the multiplexer.

The following outlines a simplification of equation (16), with a simplified form of equation (15) following therefrom by adding back in the a priori information. With respect to the probability distribution function $p(\hat{s}_k|x)$ of equation (16), the MMSE estimate $\hat{s}_k$ is known to approximate a Gaussian distribution. Accordingly, it follows that the probability distribution function may be given as $$p(\hat{s}_k \mid x) \approx \frac{1}{2\pi\sigma_k^2} \exp\left(-\frac{|\hat{s}_k - \mu_k|^2}{2\sigma_k^2}\right) \quad (17)$$

with mean $\mu_{k,i} = \langle \hat{s}_k | s_k = \mathrm{map}(x) \rangle$ and per-real dimension variance $\sigma_k^2 = \mathrm{var}(\hat{s}_k|s_k = \mathrm{map}(x))/2$. Noting that $\hat{s}_k = w_k^H \hat{y}_k$ with $\hat{y}_k$ as defined in equation (9), the mean of the conditional MMSE estimate may follow as $$\mu_k = \langle \hat{s}_k | s_k = \mathrm{map}(x) \rangle = w_k^H h_k \mathrm{map}(x) \quad (18)$$

Again, using the definition of $\hat{y}_k$ as in equation (9), the per-real dimension variance of the conditional MMSE estimate may be obtained as $$\sigma_k^2 = \mathrm{var}(\hat{s}_k \mid s_k = \mathrm{map}(x))/2 \quad (19)$$

-continued
$$= \frac{1}{2} w_k^H (H_k \Phi_k H_k^H + 2\sigma_n^2 I_{N_r}) w_k$$

With respect to the term $P(x|x_{k,m})$ of equation (16), assuming the constituent bits of a symbol to be independent due to interleaving, this term may be expressed as a product of the constituent bit probabilities as $$P(x \mid x_{k,m}) = \prod_{j \neq m} P(x_{k,j} = b_j) \quad (20)$$

The bit probabilities $P(x_{k,j}=b_j)$ may be expressed in terms of the a priori LLR values from the demultiplexer 240a/SISO decoder 224 as follows $$P(x_{k,j} = b_j) = \frac{e^{b_j L_{A1}(x_{k,j})/2}}{e^{L_{A1}(x_{k,j})/2} + e^{-L_{A1}(x_{k,j})/2}} \quad (21)$$

Substituting equations (17), (18), (19), (20), and (21) in equation (16) and using the max-log approximation ln $$\ln \sum d_j \approx \max \ln d_j,$$

the extrinsic LLR value of the $m^{th}$ bit of the $k^{th}$ stream may be obtained as $$L_{E1}(x_{k,m}) \approx \max_{x \in X_{m,+1}} \frac{1}{2} \left\{ -\frac{|\hat{s}_k - \mu_k|^2}{\sigma_k^2} + x_{[m]}^T \cdot L_{A1,[m]}(x_k) \right\} - \max_{x \in X_{m,-1}} \frac{1}{2} \left\{ -\frac{|\hat{s}_k - \mu_k|^2}{\sigma_k^2} + x_{[m]}^T \cdot L_{A1,[m]}(x_k) \right\} \quad (22)$$

where $X_{m,b}$ denotes the set of M×1 bit vectors x whose $m^{th}$ bit value is b (i.e., +1 or −1), $x_{[m]}$ is the subvector of x omitting the $m^{th}$ element $x_m$, and $L_{A1,[m]}(x_k)$ is an (M−1)×1 vector containing the a priori information for the $k^{th}$ stream with the $m^{th}$ element $L_{A1}(x_{k,m})$ omitted. Again, the a posteriori LLR value, as computed by APP calculator 308, is equation (22) with the a priori information $L_{A1}(x_{k,m})$ added back in. As shown by equation (22), APP calculator 308 has a per bit complexity that is exponential in the number of bits M per symbol, as opposed to the exponential complexity in $MN_t$ for prior art joint-stream demappers.

Figure 4:
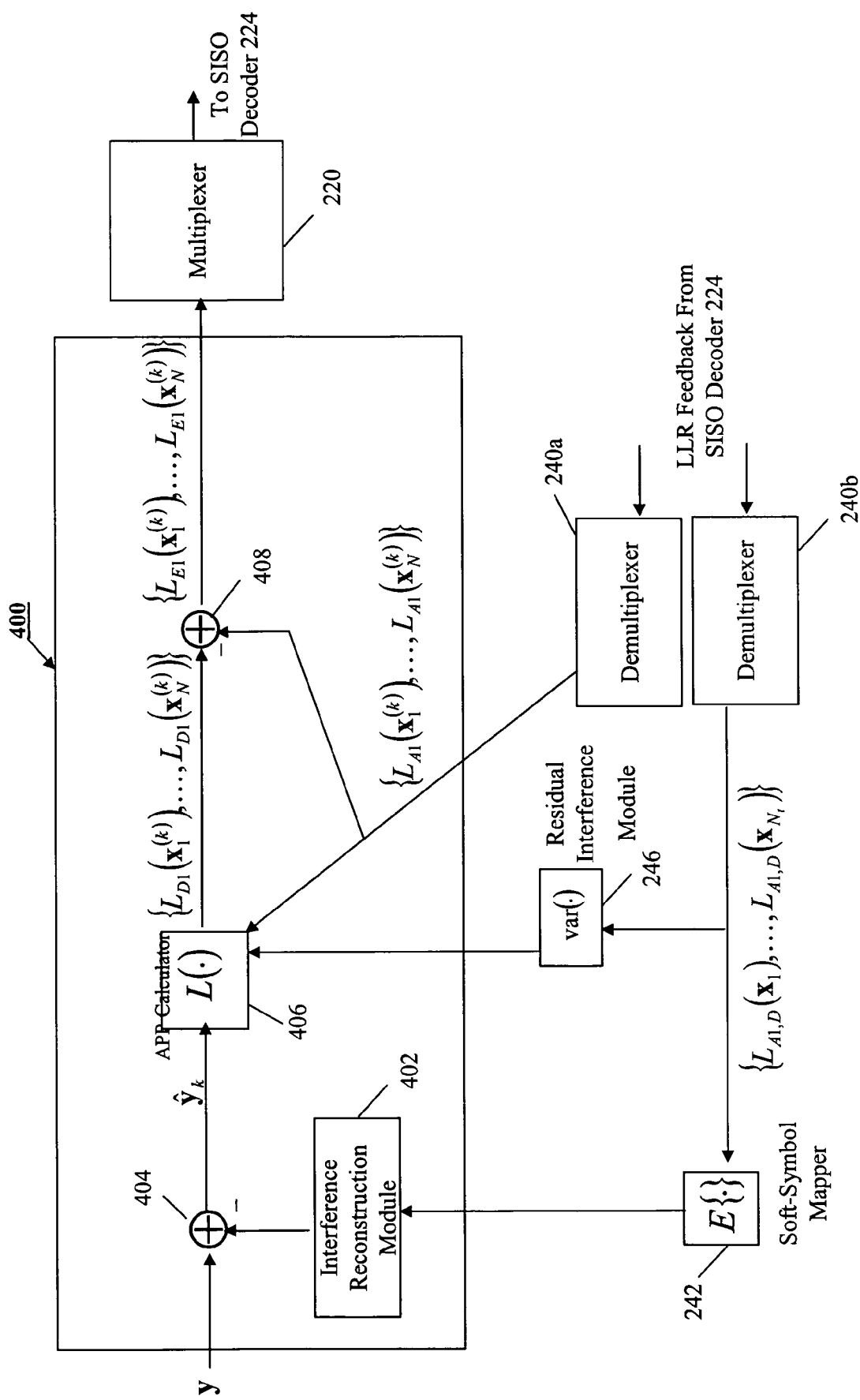
FIG. 4 shows a functional architecture of a group stream demapper according to an embodiment of the invention.

Referring now to FIG. 4, there is a shown a functional architecture of one instance of a group stream demapper 400 according to an embodiment of the invention. For ease of description, it is assumed that the demapper of FIG. 4 demaps a $k^{th}$ group of streams where the number of streams in the group is greater than one and less than $N_t$. Again, a group size of one stream is demapped using a single stream demapper 300. A group size of $N_t$ streams corresponds to joint detection among all streams at once. Each instance of a group stream demapper 400 within a demapper 210 may resemble the functional architecture as shown in FIG. 4.

As shown, group stream demapper 400 includes an interference reconstruction module 402, an interference canceller 404, and an APP (i.e., soft information) calculator 406. As indicated above, according to an embodiment of the invention group stream demapper 400 uses soft cancellation to first remove the contribution (i.e., interference) of all interfering streams not in group k from received signal vector y, and then jointly demaps the streams of the group to the M coded bits that constitute each stream by computing soft information for each bit. Interference reconstruction module 402 and interference canceller 404 perform the soft cancellation and APP calculator 406 performs the demapping.

Beginning with interference reconstruction module 402, this modules receives from soft symbol mapper 242 each of the reconstructed soft symbols of all interfering streams not in the $k^{th}$ group and filters these symbols through their channel responses to yield their effective contributions to the received signal vector y. Thereafter, interference canceller 404 removes the contributions of the interfering streams from the received signal vector y to yield a "cleaned" signal vector that has the contributions of the interfering streams removed. Again, the combined operation may be expressed as shown in equation (6) where $\hat{y}_k$ now represents the "cleaned" signal vector containing contributions from each of the streams in the $k^{th}$ group. Again, note that with respect to the term "cleaned", $\hat{y}_k$ may have some residual interference depending on how reliably the interfering symbols are reconstructed. The more accurate the reconstruction, the better the cancellation. Conversely, the less accurate the reconstruction, the more the residual interference.

Turning now to APP calculator 406, this module takes the "cleaned" signal vector $\hat{y}_k$ from interference canceller 404 and jointly computes soft information for the constituent bits of all symbols belonging to the $k^{th}$ group and thereafter forwards this soft information to multiplexer 220, thereby completing the demapping of the symbols in the group. According to an embodiment of the invention, APP calculator 406 produces the soft information by jointly computing a posteriori LLR values for the constituent bits of the symbols in the group. Specifically, given the observation $\hat{y}_k$, the a posteriori LLR value for the $m^{th}$ bit of the $n^{th}$ stream of the $k^{th}$ group may be defined as $$L_{D1}(x_{n,m}^{(k)}) = \ln \frac{P(x_{n,m}^{(k)} = +1 \mid \hat{y}_k)}{P(x_{n,m}^{(k)} = -1 \mid \hat{y}_k)} \quad (23)$$

Applying Bayes' rule and removing the a priori part $L_{A1}(x_{n,m}^{(k)}) = \ln(P(x_{n,m}^{(k)} = +1)/P(x_{n,m}^{(k)} = -1))$ from $L_{D1}(x_{n,m}^{(k)})$, the extrinsic LLR may be expressed as $$L_{E1}(x_{n,m}^{(k)}) = \ln \frac{\sum_{X_{n,m}^{(k)}(+1)} p(\hat{y}_k \mid x^{(k)}) P(x^{(k)} \mid x_{n,m}^{(k)})}{\sum_{X_{n,m}^{(k)}(-1)} p(\hat{y}_k \mid x^{(k)}) P(x^{(k)} \mid x_{n,m}^{(k)})} \quad (24)$$

where $X_{n,m}^{(k)}(b)$ is the set of all possible vectors $x^{(k)}$ of the $k^{th}$ group whose $m^{th}$ bit of the $n^{th}$ stream takes the value b (i.e., +1 or −1).

Note that the output of APP calculator 406 is a sequence of a posteriori LLR values for the M bits of each stream of the group, each LLR value being given as equation (23). This stream of a posteriori LLR values is denoted as $\{L_{D1}(x_1^{(k)}), \ldots, L_{D1}(x_N^{(k)})\}$ in FIG. 4, assuming the streams of the $k^{th}$ group are number 1-N. Thereafter, the a posteriori LLR values $\{L_{D1}(x_1^{(k)}), \ldots, L_{D1}(x_N^{(k)})\}$ are forwarded through module 408, where a priori information for each of the M bits, as obtained from demultiplexer 240a/SISO decoder 224 and denoted as $\{L_{A1}(x_1^{(k)}), \ldots, L_{A1}(x_N^{(k)})\}$ in FIG. 4, is subtracted from the a posteriori LLR values to obtain a sequence of extrinsic LLR values for the M bits. Each extrinsic LLR value is given as equation (24) and the sequence of extrinsic values is denoted as $\{L_{E1}(x_1^{(k)}), \ldots, L_{E1}(x_N^{(k)})\}$ in FIG. 4. The extrinsic LLR values are subsequently forwarded to multiplexer 220, thereby completing the demapping of the symbols in the group.

The following outlines a simplification of equation (24) and also the corresponding a posteriori LLR value equation. Beginning with the term $p(\hat{y}_k \mid x^{(k)})$ of equation (24), the "cleaned" signal vector $\hat{y}_k$ may be expressed as $$\hat{y}_k = Hs - \underbrace{H_{\bar{k}} \bar{s}_{\bar{k}}}_{\text{reconstructed interference}} + n \quad (25)$$

$$= \underbrace{H_k s_k}_{\text{desired stream}} + \underbrace{H_{\bar{k}} s_{\bar{k}}}_{\text{actual interference}} - \underbrace{H_{\bar{k}} \bar{s}_{\bar{k}}}_{\text{reconstructed interference}} + n$$

$$= H_k s_k + \underbrace{H_{\bar{k}} (s_{\bar{k}} - \bar{s}_{\bar{k}})}_{\text{residual interference}} + n$$

As one skilled in the art will recognize, conditioned on the channel estimates and the transmitted symbols, $\hat{y}_k$ is a multivariate complex Gaussian distribution completely determined by its mean and covariance matrix. From equation (25), the mean of $\hat{y}_k \mid x^{(k)}$ may be readily obtained as $$\langle \hat{y}_k \mid x^{(k)} \rangle = H_k s_k(x^{(k)}) \quad (26)$$

The covariance matrix $Z_k$ of $\hat{y}_k \mid x^{(k)}$ may be computed as $$Z_k = E\{(\hat{y}_k \mid x^{(k)})(\hat{y}_k \mid x^{(k)})^\dagger\} - E\{\hat{y}_k \mid x^{(k)}\} E\{\hat{y}_k \mid x^{(k)}\}^\dagger \quad (27)$$

$$= H_{\bar{k}} \Theta_{\bar{k}} H_{\bar{k}}^\dagger + 2\sigma_n^2 I_{N_r}$$

where $\Theta_{\bar{k}}$ is a diagonal matrix containing the variances of the interfering symbols not in the $k^{th}$ group, the superscript † indicates the complex-conjugate transpose, and $I_{N_r}$ is the identity matrix of size $N_r$. The variances of the interfering symbols is given as equations (13) and (14) and is provided to APP calculator 406 by residual interference module 246, as similarly described above. Given the mean and covariance matrix, $p(\hat{y}_k \mid x^{(k)})$ is a completely known multivariate complex Gaussian distribution that may be expressed as $$p(\hat{y}_k \mid x^{(k)}) = \frac{1}{\pi^{N_r} |Z_k|} \exp\left(-(\hat{y}_k - H_k s_k(x^{(k)}))^\dagger Z_k^{-1} (\hat{y}_k - H_k s_k(x^{(k)}))\right) \quad (28)$$

where $|Z_k|$ and $Z_k^{-1}$ represent the determinant and inverse, respectively, of the covariance matrix $Z_k$. In equation (28), $s_k(x^{(k)})$ denotes the mapping from the bit vector $x^{(k)}$ to the symbol space.

Turning to the term $P(x^{(k)} \mid x_{n,m}^{(k)})$ of equation (24), given the independence of the bits in the vector $x^{(k)}$, $P(x^{(k)} \mid x_{n,m}^{(k)})$ may be represented as a product of the constituent bit probabilities as $$P(x^{(k)} | x_{n,m}^{(k)}) = \prod_{(ij) \neq mn} P(x_{i,j}^{(k)} = b_{i,j}) \qquad (29)$$

The bit probabilities $P(x_{i,j}^{(k)}=b_{i,j})$ may be expressed in terms of the a priori LLR values from the demultiplexer 240a/SISO decoder 224 as follows $$P(x_{i,j}^{(k)} = b_{i,j}) = \frac{e^{b_{i,j}L_{A1}(x_{i,j}^{(k)})/2}}{e^{L_{A1}(x_{i,j}^{(k)})/2} + e^{-L_{A1}(x_{i,j}^{(k)})/2}} \qquad (30)$$

Substituting equations (28), (29), and (30) in equation (24) and using the standard max-log approximation ln $$\sum d_j \approx \max \ln d_j,$$

the a posteriori LLR value for the $m^{th}$ bit of the $n^{th}$ stream of the $k^{th}$ group, as computed by APP calculator 406, may be obtained as $$L_{D1}(x_{n,m}^{(k)}) \approx \qquad (31)$$
$$\max_{x_{n,m}^{(k)}(+1)} \Lambda(\hat{y}_k, x^{(k)}, L_{A1}(x^{(k)})) - \max_{x_{n,m}^{(k)}(-1)} \Lambda(\hat{y}_k, x^{(k)}, L_{A1}(x^{(k)}))$$

where $$\Lambda(\hat{y}_k, x^{(k)}, L_{A1}(x^{(k)})) = \qquad (32)$$
$$-(\hat{y}_k - H_k s_k(x^{(k)}))^\dagger Z_k^{-1}(\hat{y}_k - H_k s_k(x^{(k)})) + \frac{1}{2} \sum_{\substack{i=1,\ldots,N \\ j=1,\ldots,M}} x_{i,j}^{(k)} L_{A1}(x_{i,j}^{(k)})$$

In turn, the extrinsic LLR value $L_{E1}(x_{n,m}^{(k)})$ for the $m^{th}$ bit of the $n^{th}$ stream of the $k^{th}$ group may be obtained by subtracting the a priori part $L_{A1}(x_{n,m}^{(k)})$ from $L_{D1}(x_{n,m}^{(k)})$, which operation is performed by module 408 as indicated above. As shown by equations (31) and (32), for each bit the a posteriori LLR computation as computed by APP calculator 406 requires hypothesizing over $2^{MN}$ bit vectors (assuming the number of streams in the group is N (N<$N_t$)) and accordingly, has reduced complexity as compared to a joint detection over all $N_t$ streams.

Note that if group construction module 244 forms a single group that includes all $N_t$ streams, demapper 210 condenses to a single group demapper 400. Here, $\hat{y}_k = y$ in that there is no soft cancellation and the above per bit a posteriori LLR computation becomes a joint detection among all streams with a complexity in the product of the number of simultaneously transmitted streams $N_t$ and the bits per symbol M.

According to another embodiment of the invention, APP calculator 406 may be a reduced search APP (i.e., soft information) calculator. Specifically, such an APP calculator may compute the soft information of the constituent bits of the symbols in the $k^{th}$ group by computing the a posteriori LLR values as described above with respect to equations (31) and (32). However, rather than hypothesizing over all $2^{MN}$ bit vectors for each bit, only a subset of these bit vectors may be considered using a reduced search technique, such as the list sphere detector (LSD) described by Hochwald et al., in "Achieving near-capacity on a multiple-element channel," IEEE Trans. Commun., vol. 51, no. 3, pp. 389-399, March 2003 or the list-sequential (LISS) detector described by S. Baro, et al., in "Iterative detection of MIMO transmission using a list-sequential (LISS) detector," in Proc. Int. Conf Communications, May 2003, pp. 2653-2657, which documents are hereby incorporated by reference as if fully set forth in their entirety herein. One skilled in the art will recognize that other reduced search techniques may be used without deviating from the present invention.

Notably, by using a reduced search technique it becomes possible to devise groups of larger sizes as compared to when an exhaustive search is used as described above. Thus, performance may be further improved since more streams may be jointly detected than otherwise possible.

Notably, the reduced search APP calculation techniques as described by Hochwald and Baro, for example, only apply to a single group having all $N_t$ streams, and not to groups having fewer than $N_t$ streams. In particular, the techniques described by Hochwald and Baro assume that the noise vector n of received signal vector y is spatially white. However, when using a group (i.e., a $k^{th}$ group) having fewer than $N_t$ streams, this condition is no longer satisfied because the noise vector in "cleaned" signal vector $\hat{y}_k$ from interference canceller 404 now additionally includes interference from the other groups, thereby rendering signal vector $\hat{y}_k$ spatially colored. Accordingly, to apply reduced search techniques to a $k^{th}$ group having fewer than $N_t$ streams, it is necessary to perform additional signal conditioning on the signal vector $\hat{y}_k$ to effectively convert this signal, which has spatially-colored noise, to one with spatially-white noise. This process is called "whitening" and may be performed as follows.

The covariance matrix of the noise of signal vector $\hat{y}_k$ is given by $Z_k$ in equation (27). Using standard matrix decomposition methods such as Cholesky decomposition, the noise (strictly speaking, additive white Gaussian noise plus interference from other groups) covariance matrix may be factored as $$(Z_k)^{-1} = C^\dagger C \qquad (33)$$

The matrix C is referred to as the whitening filter. Pre-multiplying $\hat{y}_k$ with C, the signal model of equation (25) now becomes $$C\hat{y}_k = CH_k s_k + C(H_{\bar{k}}(s_{\bar{k}} - \bar{s}_{\bar{k}}) + n) \qquad (34)$$

Defining the new conditioned signal of $\hat{y}_k$ as $y'_k = C\hat{y}_k$, a new channel matrix for the desired $k^{th}$ group as $H'_k = CH_k$, and a new noise vector as $z'_k = C(H_{\bar{k}}(s_{\bar{k}} - \bar{s}_{\bar{k}}) + n)$, a new signal model for the signal going into APP calculator 406 for the $k^{th}$ group is obtained as $$y'_k = H'_k s_k + z'_k \qquad (35)$$

It can be shown that $z'_k$ is now spatially white, that is, its covariance matrix is an identity matrix. The noise power per receive element, given by the diagonal elements of the identity matrix, are all the same with a value of unity.

Upon conditioning signal vector $\hat{y}_k$ from interference canceller 404 to be a signal vector $y'_k$ with spatially-white noise, signal vector $y'_k$ may be applied to a reduced search APP calculator 406. For example, given a signal vector $y'_k$, a reduced search APP calculator using a list sphere detector approach may compute an a posteriori LLR value for the $m^{th}$ bit of the $n^{th}$ stream of the $k^{th}$ group as $$L_{D1}(x_{n,m}^{(k)}) \approx \max_{x_{n,m}^{(k)}(+1,R)} \Lambda(y'_k, x^{(k)}, L_{A1}(x^{(k)})) - \max_{x_{n,m}^{(k)}(-1,R)} \Lambda(y'_k, x^{(k)}, L_{A1}(x^{(k)})) \quad (36)$$

where $$\Lambda(y'_k, x^{(k)}, L_{A1}(x^{(k)})) = -\|y'_k - H'_k s_k(x^{(k)})\|^2 + \frac{1}{2} \sum_{\substack{i=1,\ldots,N \\ j=1,\ldots,M}} x_{i,j}^{(k)} L_{A1}(x_{i,j}^{(k)}) \quad (37)$$

and $x_{n,m}^{(k)}(b,R)$ denotes the set of candidate bit vectors that are within a certain radius R about $y'_k$ (assuming such bit vectors have been identified) and whose $m^{th}$ bit of the $n^{th}$ stream takes the value b. Equations (36) and (37) may be obtained by substituting the new signal and noise model as described above into equations (31) and (32). One skilled in the art will recognize that other reduced search techniques may also be used, with equations (36) and (37) remaining the same but using different techniques to select the candidate bit vectors.

Notably, the reduced search techniques of the prior art, such as the one based on sphere detection, are able to perform the joint APP calculation among all $N_t$ streams with reasonable complexity only under certain conditions, one of which is that $N_r$, the number of receive elements, cannot be less than $N_t$, the number of transmitted streams. According to the present invention, it is possible to partition the difficult problem of joint-demapping of one large group of $N_t$ streams where $N_t > N_r$ into several smaller groups wherein no more than $N_r$ streams need to be jointly demapped in any given group. Thus, using the "divide and conquer" approach of the present invention ensures that within each group there are at least as many receive elements as the number of streams being jointly detected, thereby enabling the use of reduced search demappers within all groups.

Referring now to group construction module 244, as described above, this module assigns each of the $N_t$ streams to a group, each group having one or more members, and thereafter associates each group with either a single stream demapper 300 or a group stream demapper 400. According to an embodiment of the invention, group construction module 244 assigns the streams to groups in order to obtain a balance between the processing power of the receiver and a desired receiver performance. Specifically, the performance of demapper 210 generally improves as more streams are added to the same group such that the streams are jointly detected (i.e., the performance of demapper 210 generally improves as the demapper converges to one group stream demapper). However, increasing the size of any group also increases the overall complexity of demapper 210, with each group stream demapper having bit wise complexity that is exponential in the number of streams in the group and the number of bits M per symbol, for example. According to an embodiment of the invention, group construction module 244 adjusts the overall complexity of demapper 210 to correspond to the processing power of the receiver to obtain a maximum possible performance for a given receiver complexity. In other words, the present invention is able to deliver a receiver performance that takes full advantage of the receiver processing power.

Specifically, according to an embodiment of the invention, based on the processing power of the receiver and a desired performance, group construction module 244 may be provided with a number of groups and with the number of stream members each group is to contain. Again, the number and size of each group determines the overall complexity of demapper 210. The size of each group may be the same or the size may vary between groups. According to an embodiment of the invention, group construction module 244 may thereafter assign streams to the groups such that the more correlated streams are assigned to the same groups, thereby maximizing performance.

For example, assume a receiver can handle $N_g$ groups and the number of streams per group is ordered (i.e., varies) such that the first group is to contain more members than the second group, etc. (i.e., $N_{grp,s}^{(1)} > N_{grp,s}^{(2)} > \ldots N_{grp,s}^{(N_g)}$). According to an embodiment of the invention, group construction module 244 may thereafter assign streams to these $N_g$ groups based on the pair-wise correlations between the streams. Specifically, assuming group construction module 244 is provided with channel matrix H, the module may first compute the pair-wise correlation $\rho_{p,q}$ between all streams p and q, p≠q as $$\rho_{p,q} = \frac{|h_p^* h_q|}{|h_p||h_q|} \quad (38)$$

Thereafter, beginning with the group of the largest size (i.e., $N_{grp,s}^{(1)}$), group construction module 244 may enumerate all possible stream groupings of size $N_{grp,s}^{(1)}$ given the available pool of $N_s = N_t$ streams. In general, there are $$F(N_s, N_{grp,s}^{(1)}) = \binom{N_s}{N_{grp,s}^{(1)}}$$

such hypothetical groups. These groups may be denoted as: $\hat{G}_1, \ldots \hat{G}_{F(N_s,N_{grp,s}^{(1)})}$. As an example, considering the case where $N_s = N_t = 4$ and $N_{grp,s}^{(1)} = 3$, then the possible groupings are $\hat{G}_1 = (s_1, s_2, s_3)$, $\hat{G}_2 = (s_1, s_2, s_4)$, $\hat{G}_3 = (s_1, s_3, s_4)$, and $\hat{G}_4 = (s_2, s_3, s_4)$.

For each such group $\hat{G}_i$, $i=1, \ldots, F(N_s, N_{grp,s}^{(1)})$, group construction module 244 may then determine a group-correlation metric value and then select as the members of the first group that group that has the highest metric value. For example, group construction module 244 may use the average correlation of all the pair-wise correlation values among each group's membership as the overall group-correlation metric value. In the above example, there are three $$\left( = \binom{N_{grp,s}^{(1)}}{2} \right)$$

possible pair-wise groupings for each group. The group-correlation metric value is the average of these $$\binom{N_{grp,s}^{(1)}}{2}$$

pair-wise correlation values. Assuming that $\hat{G}_n$ has the highest value for the group-correlation metric value (i.e., $\hat{G}_n = \max\{\hat{G}_i\}_{i=1,\ldots,F(N_s,N_{grp,s}^{(1)})}$), group construction module 244 would then select $\hat{G}_n$ as the first chosen group.

Next, group construction module 244 may remove the members of the chosen group from the $N_s$ streams, thereby making the available pool for the next group $N_s-N_{grp,s}^{(1)}$ streams. Using the same process as described above, the group construction module may then use the remaining streams to construct a new group of the specified size $N_{grp,s}^{(2)}$ and designate this as the second chosen group. The group construction module 244 may then remove the streams in this second group from the $N_s-N_{grp,s}^{(1)}$ streams to produce the remaining unassigned streams, and proceed with the construction of the third group. The group construction module may repeat this process until all of the streams are allocated to the various groups.

Notably, assuming group construction module 244 is statically configured to form $N_g$ groups, the group-construction process described above enforces a hard control on complexity since it always results in the same number of groups regardless of the actual correlation among streams. However, as the channel varies the correlation among streams may also vary. According to an embodiment of the invention, to allow for a tighter coupling between the channel correlation and complexity, group construction module 244 may be provided with an additional control knob $\rho_{th}$, which is a threshold setting for the group-correlation metric value. According to this embodiment of the invention, the group construction module may form the $N_g$ groups as described above. Thereafter, of the $N_g$ groups, the group construction module may select only those groups whose group-correlation metric value equals or exceeds $\rho_{th}$ and may assign these groups to respective group stream demappers 400. As for the groups that do not meet this criterion, the group construction module may assign the streams of these groups to respective single stream demappers 300. Control knob $\rho_{th}$ may be defined to have values between zero (0) and one (1), to correspond to the group-correlation metric value. Notably, when $\rho_{th}=1$, the group construction module assigns all streams to a respective single-stream demapper. Similarly, when $\rho_{th}=0$, the group construction module retains the original groups, assigning each group to a respective group stream demapper or single stream demapper, based on the group size.

One skilled in the art will recognize that group construction module 244 may assign streams to groups using processes other than those described above without deviating from the invention.

Although the present invention has been described in relation to particular embodiments thereof, many other variations and modifications and other uses will become apparent to those skilled in the art. Therefore, the present invention should be limited not by the specific disclosure herein, but only by the appended claims.

What is claimed is:

1. A method for recovering a bit data sequence from a received signal that includes a plurality of complex symbols transmitted by a space-time bit-interleaved coded modulation (STBICM) transmitter, said method comprising:
   assigning each complex symbol to a respective one of two or more groups, wherein at least one of said groups includes two or more complex symbols;
   for each group, removing from the received signal contributions of the one or more complex symbols that are not members of the group to produce a cleaned signal;
   for each group, using the cleaned signal to demap the one or more complex symbols that are members of the group to form a plurality of soft information values that represent a portion of a coded bit sequence; and
   decoding at least the soft information values from each group to produce a first sequence of soft information values that represent the bit data sequence.

2. The method of claim 1, further comprising using the first sequence of soft information values to determine the bit data sequence.

3. The method of claim 1, wherein said decoding also produces a second sequence of soft information values that represent the coded bit sequence.

4. The method of claim 3, further comprising using the second sequence of soft information values to form soft symbols representing the complex symbols, and wherein said removing, using, and decoding are iterative such that for said groups, a subsequent removing includes using the soft symbols corresponding to the one or more complex symbols that are not members of the groups to determine the contributions of said one or more complex symbols to the received signal.

5. The method of claim 4, wherein the second sequence of soft information values contains new and old information regarding the coded bit sequence.

6. The method of claim 3, wherein said removing, using, and decoding are iterative such that for said groups, a subsequent using the cleaned signal to demap the one or more complex symbols includes using a portion of the second sequence of soft information values to demap the one or more complex symbols.

7. The method of claim 1, wherein for at least one group, said removing includes spatially filtering the cleaned signal.

8. The method of claim 1, wherein for at least one group having two or more complex symbols, said using the cleaned signal to demap the one or more complex symbols includes using a reduced search technique.

9. The method of claim 1, wherein said assigning comprises assigning complex symbols to the groups based on a correlation between the complex symbols.

10. The method of claim 9, wherein said assigning includes reassigning the complex symbols of a formed group to a respective single member group when the complex symbols of the formed group have an average correlation below a threshold.

11. The method of claim 1, wherein a maximum number of complex symbols assigned to any one of the groups is based on a processing power of a receiver.

12. The method of claim 1, further comprising receiving the complex symbols by one or more receive elements, wherein there are fewer receive elements than complex symbols.

13. A system for recovering a bit data sequence from a received signal that includes a plurality of complex symbols transmitted by a space-time bit-interleaved coded modulation (STBICM) transmitter, said system comprising:
   two or more demappers configured to have one or more complex symbols associated therewith, with at least one of said demappers having two or more complex symbols associated therewith, wherein said demappers include:
      a cancellation module configured to remove from the received signal contributions of the one or more complex symbols that are not associated with the demapper to produce a cleaned signal; and
      a soft information calculator configured to use the cleaned signal from the cancellation module to demap the one or more complex symbols that are associated with the demapper to form a plurality of soft information values that represent a portion of a coded bit sequence; and
   a decoder in communication with said demappers and configured to decode at least the soft information values from said demappers to produce a first sequence of soft information values that represent the bit data sequence.

14. The system of claim 13, further comprising a hard decision module in communication with said decoder and configured to use the first sequence of soft information values to determine the bit data sequence.

15. The system of claim 13, wherein said decoder also produces a second sequence of soft information values that represent the coded bit sequence.

16. The system of claim 15, further comprising:

a soft-symbol mapper in communication with said decoder and configured to use the second sequence of soft information values to form soft symbols representing the complex symbols;

wherein said soft-symbol mapper is also in communication with said cancellation modules of said demappers such that said system is an iterative loop system; and wherein said cancellation module of a given demapper uses the soft symbols from a previous iteration and corresponding to the one or more complex symbols that are not associated with the given demapper to determine the contributions of these one or more complex symbols to the received signal.

17. The system of claim 13, wherein for at least one demapper, said soft information calculator is a reduced search soft information calculator.

18. The system of claim 13, wherein at least one demapper further includes a spatial filter module that spatially filters the cleaned signal from said cancellation module and forwards the spatially filtered cleaned signal to said soft information calculator.

19. The system of claim 13, further comprising a group construction module configured to associate each complex symbol with a respective demapper.

20. The system of claim 19, wherein said group construction module associates complex symbols to said demappers based on a correlation between the complex symbols.

21. The system of claim 13, wherein a maximum number of complex symbols associated with any one of said demappers is based on a processing power of a receiver.

22. The system of claim 13, further comprising one or more receive elements configured to receive the complex symbols, wherein there are fewer receive elements than complex symbols.

* * * * *

UNITED STATES PATENT AND TRADEMARK OFFICE
CERTIFICATE OF CORRECTION

PATENT NO.       : 7,593,489 B2                                Page 1 of 1
APPLICATION NO.  : 11/374835
DATED            : September 22, 2009
INVENTOR(S)      : Koshy et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 498 days.

Signed and Sealed this

Fourteenth Day of December, 2010

David J. Kappos
*Director of the United States Patent and Trademark Office*